Figures 1, 2:
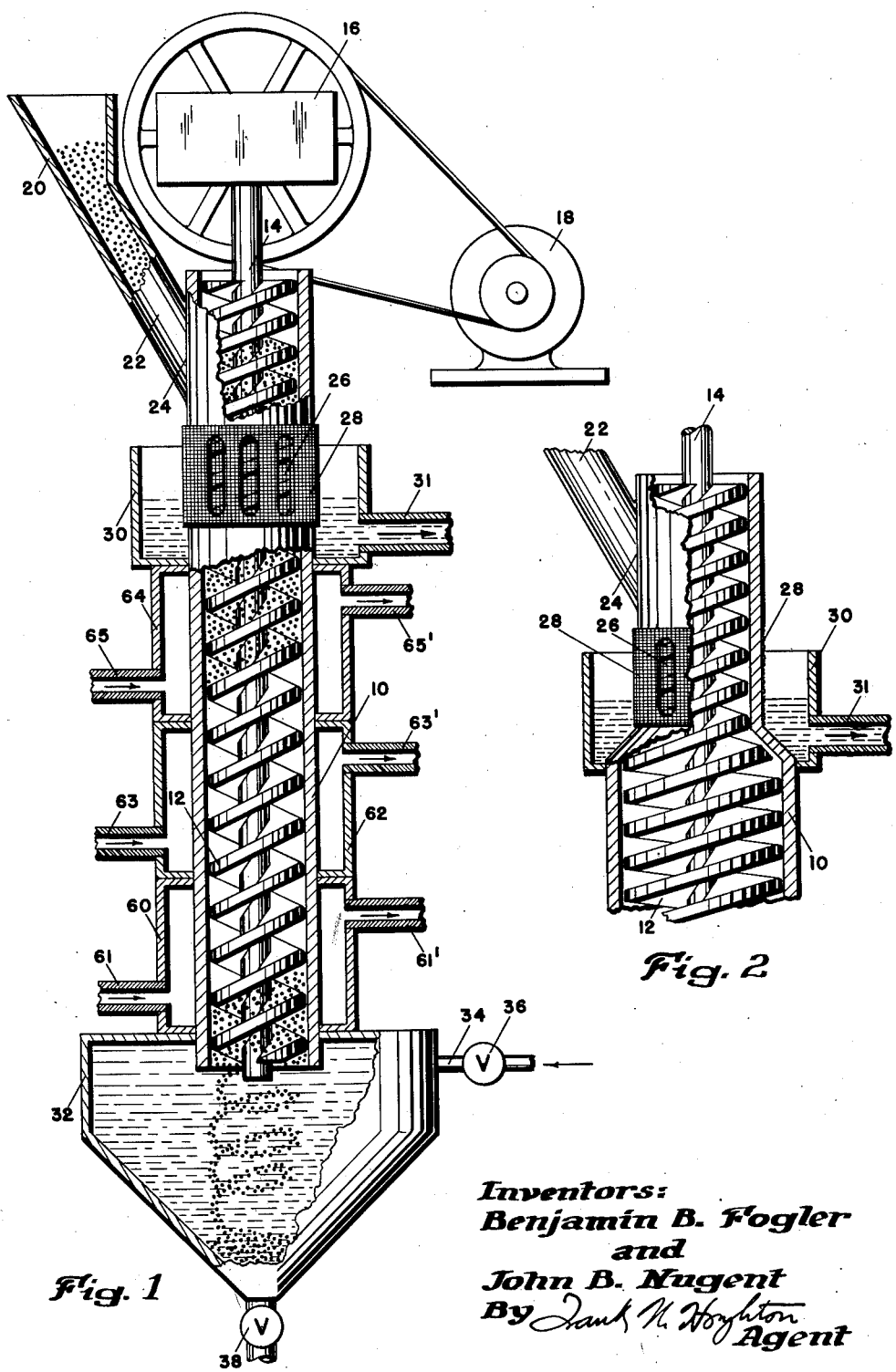

Feb. 24, 1953  B. B. FOGLER ET AL  2,629,663
METHOD OF EXTRACTING GROUND ROASTED COFFEE
Filed Feb. 8, 1947  3 Sheets-Sheet 1

Inventors:
Benjamin B. Fogler
and
John B. Nugent
By Frank N. Houghton
Agent

Feb. 24, 1953   B. B. FOGLER ET AL   2,629,663
METHOD OF EXTRACTING GROUND ROASTED COFFEE
Filed Feb. 8, 1947   3 Sheets-Sheet 2

Inventors:
Benjamin B. Fogler
and
John B. Nugent
By Frank N. Houghton
Agent

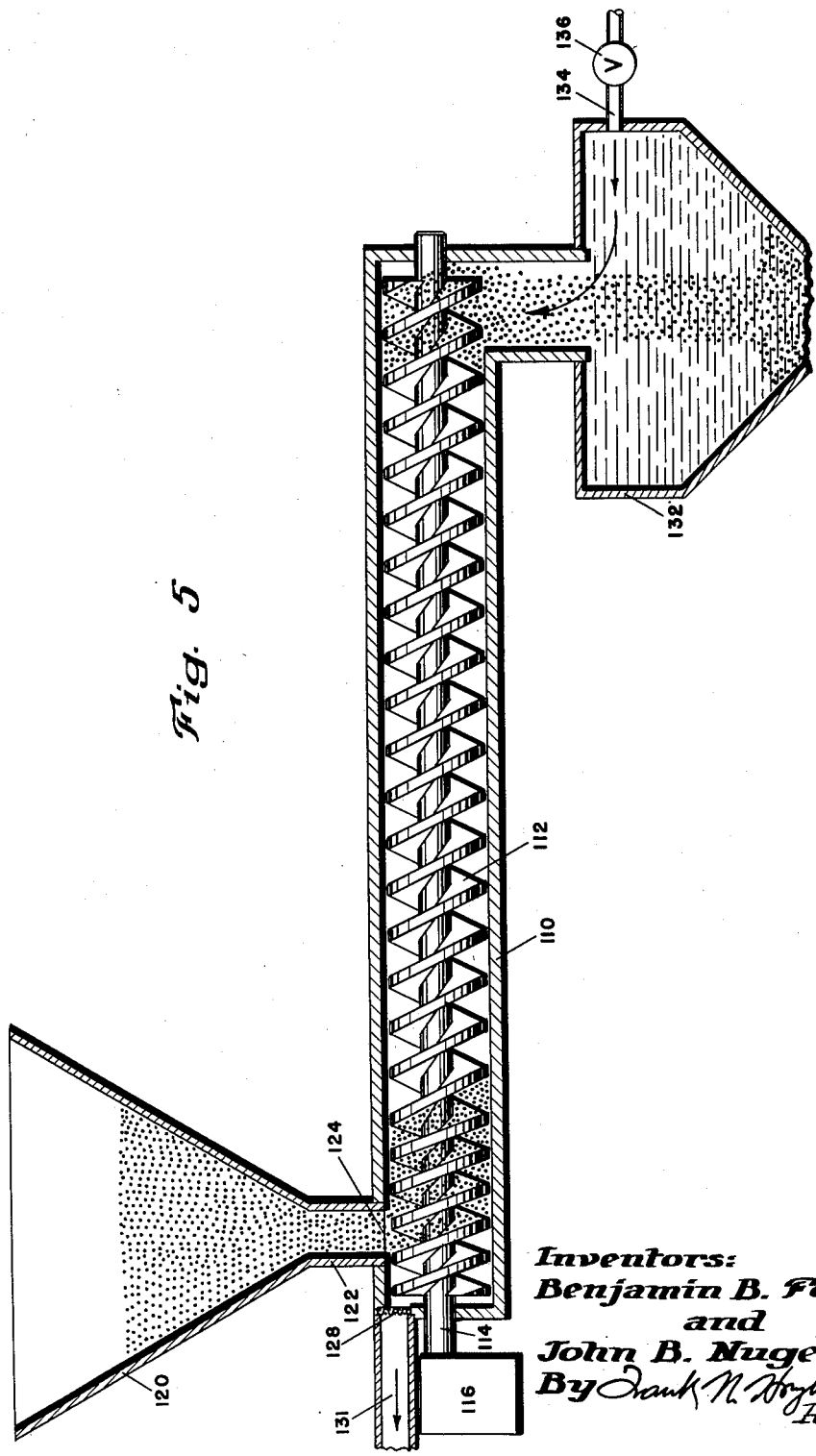

Patented Feb. 24, 1953

2,629,663

UNITED STATES PATENT OFFICE 2,629,663

METHOD OF EXTRACTING GROUND ROASTED COFFEE

Benjamin B. Fogler, Lexington, and John B. Nugent, Winthrop, Mass., assignors to Arthur D. Little, Inc., Cambridge, Mass., a corporation of Massachusetts Application February 8, 1947, Serial No. 727,358

2 Claims. (Cl. 99—71)

This invention relates to means and method for the continuous, countercurrent liquid phase extraction of ground roasted coffee, wherein hot water is the extracting medium and both the water and the coffee are moved continuously and countercurrently through the extracting zone.

The so-called continuous processes now known in this art for extracting coffee (whether roasted or not) with water are, in fact, only in part continuous—because although the water flows continuously, or substantially so, through the coffee mass, the latter is maintained stationary in a battery of extractors of which one or more is always being dumped or loaded while the others are successively on stream. Such procedures, while continuous or nearly so with respect to the extractant, are therefore batchwise with respect to the coffee.

A significant disadvantage in such procedures is the variation in characteristics of the resulting extract. Since periodically an exhausted batch of coffee must be removed from the stream, and a fresh batch must be added at the other end of the stream, the extractant as it flows from the last of the batches will vary somewhat in character—i. e. in the nature and amount of extractives which it contains—with each of these changes of batch. These variations can of course be averaged out to substantial uniformity if the extractant is allowed to collect and mix over a sufficient period of time—i. e. during at least one batch cycle—but that involves additional equipment, containers, mixing apparatus, etc., as well as additional labor, which increase excessively the cost of the product.

The means and method of the present invention permit complete avoidance of these variations, since the procedure herein described is fully continuous. Furthermore, this invention, for its performance, does not require complicated apparatus or operating techniques, or the preparation and subsequent blending of separate kinds of extracts, or of special steps to isolate the aroma constituents and reincorporate them with the extract, or the use of high vacuum or of high pressure, or of solvents other than water. Nevertheless, the extract produced in accordance with the present invention is of the same quality and taste and aroma characteristics as those of a freshly-brewed cup of coffee made from identical grounded roasted coffee. This extract, furthermore, may be subsequently dried to form a soluble coffee powder by conventional or other means—which, however, form no part of the present invention and will accordingly be no more than briefly alluded to herein. It should be pointed out, however, that this extract may be thus dried to produce a coffee powder of excellent characteristics.

In general, the soluble solids content of ground roasted coffee is in the order of 25% by weight of the coffee. Of this soluble solids content, between about 70% and about 90% can be extracted without obtaining undesirable taste and aroma components.

The temperature of the water as introduced for extraction should be at or somewhat below the boiling point under the conditions imposed, preferably within the range of about 180° F. to 220° F. Temperatures somewhat above 212°, e. g. around 215°-220° F., are readily attained under conditions of slight superatmospheric pressure imposed upon the hot water introduced, as this water must be forced through a column of the ground coffee which is being extracted. If higher temperatures are used—as may be attained under appreciable pressure, for example temperatures above about 230° F.—an excessive proportion of the bitter components of the coffee is extracted. If lower extracting temperatures, say 165° F. or less, are used, the extract may be cloudy and contains too great a proportion of the acid components of the coffee.

On introducing water for extraction within the preferred temperature range indicated above, extraction is rapid and efficient. Thus, extraction is substantially complete in about three minutes when coffee of ordinary percolator grind is used—assuming of course that sufficient water is employed—and an increase in time of extraction or in quantity of water employed, or both, does not contribute to any significant extent in the amount or kinds of the soluble constituents extracted from the coffee. A considerable latitude is therefore possible in operation, with respect to the time of extraction and the amount of water used.

Under otherwise similar operating conditions, the lower temperature range of about 165° F. referred to above results in solubilization of about 16% of the coffee, and the higher temperature range (above about 230° F.) of about 23%, while the preferred temperature range solubilizes about 20%, or more generally about 18% to 22%. While it is true that the lower figure (16%) can be somewhat increased by a much prolonged extraction time, that is not commercially attractive. The preferred conditions herein described are also commercially attractive because they result in extraction of as much as possible of the soluble solids of the coffee in a reasonable time and without giving an undesirable bitterness or other off-taste in the product.

In accordance with the present invention, full advantage is taken of the foregoing factors in the provision of a means and method for extracting the soluble solids content of ground roasted coffee, which means and method are characterized by simplicity, economy, ease of control, and uniformity of product. Furthermore, the present process is so designed that the ordinary small variations during operation have no significant effect upon the character of the product.

According to this invention, ground roasted coffee is introduced continuously into one end of an elongated extraction zone, and hot water is introduced continuously into the other end of said zone, and the coffee and the water pass continuously through said zone countercurrently to each other.

The temperature of the water when introduced to said zone is at or somewhat below the boiling point under the conditions imposed, e. g. 180° F. to 220° F. This temperature will, of course, drop during passage of the water through the zone, unless special steps are taken to maintain it. But these are not necessary because, if the coffee as it enters the extracting zone is contacted with water at as low as about 165° F. and thereby has a relatively excessive proportion of its more acidic constituents solubilized, the other constituents, including those more bitter, will be thereafter preponderantly solubilized as the coffee is contacted with water near the boiling point at the other end of said zone, all of which will result in an overall extraction or solubilization of the proper amount and constituents of the coffee. While it is accordingly preferably to arrange the process so that the water leaves the extracting zone at a temperature not lower than about 165° F., it is evident, from the foregoing remarks, that this temperature of leaving or removal may vary within fairly wide limits.

The continuous introduction into said zone of coffee and water, the continuous removal from said zone of extracted coffee and extract, and the effecting of continuous countercurrent motion of the two principal constituents, has presented a considerable problem and one which has apparently stood in the way of a practical solution for this subject heretofore. Such a practical solution is, however, reached in accordance with the present invention.

An effective way of causing the coffee to move continuously through the extracting zone, countercurrent to the water, is to provide a cylindrical casing having therein a helical screw, the helicoid of which extends substantially to the inner walls of the casing. There is enough clearance between the outer edges of the helicoid and the casing to obviate any tendency to bind, but not enough to permit any substantial amount of coffee particles or water to pass between these edges and the inner walls of the casing. On introducing the ground coffee at one end of the casing, and the hot water at the other, and rotating the screw in the proper direction, it would be expected that the coffee would move toward the opposite end of the casing, countercurrently to the water, and be thus discharged. This, however, does not readily occur, unless relatively complicated control of feed is resorted to, and presents one of the practical operating problems which is solved by the present invention. Under the conditions just mentioned, the coffee as it is introduced becomes first superficially wetted and then thoroughly saturated with the water, and on doing so it swells appreciably—to the extent that its volume increases some 10% (or more or less depending upon grind and other factors)—and the turns of the helical screw become so firmly plugged that the coffee does not move beyond the first few turns of the screw. Under such conditions the operation stops, as no more coffee can be introduced into the extracting zone. This difficulty is overcome by providing, at and beyond the point in its travel at which the coffee comes in contact with the water and consequently increases in volume because of saturation, a larger pitch for the turns of the screw, or a larger diameter of the casing, or in any other way a larger cross-sectional area in the path traversed by the coffee and the water. This increase in cross-sectional area of the path, which path is defined by the adjacent facing surfaces of the helicoid, the inner walls of the casing, and the axis or axle wall, in the arrangement described above, should usually be in the order of 10%, or, more generally, within the range of 7% to 25%. With this arrangement, the ground coffee moves evenly through the extracting zone, filling the zone from side to side throughout its extent, without plugging or jamming at any point.

Figure 4:
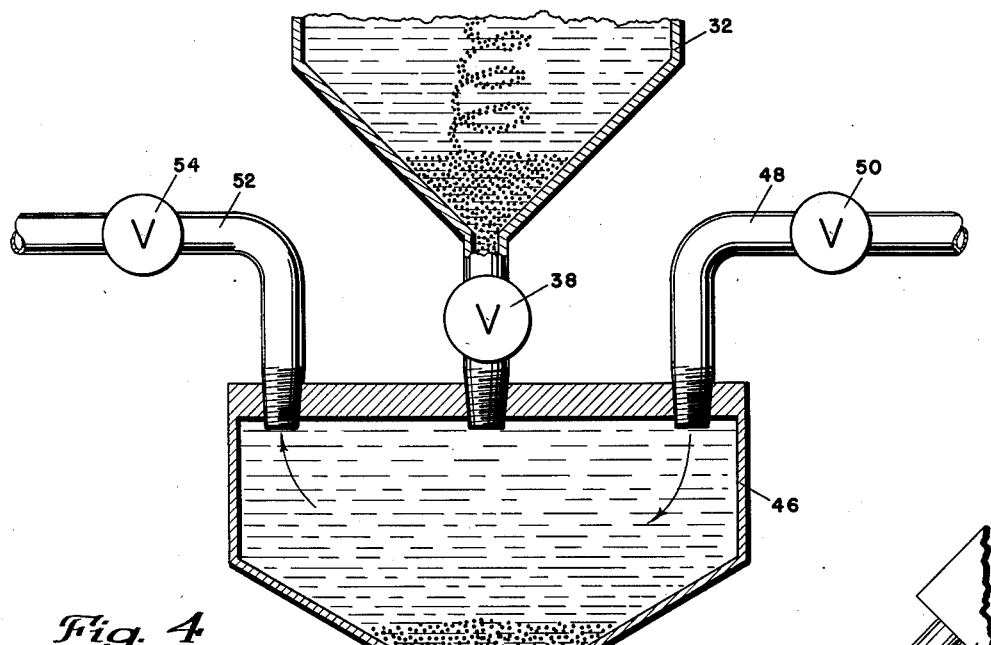
Figure 3:
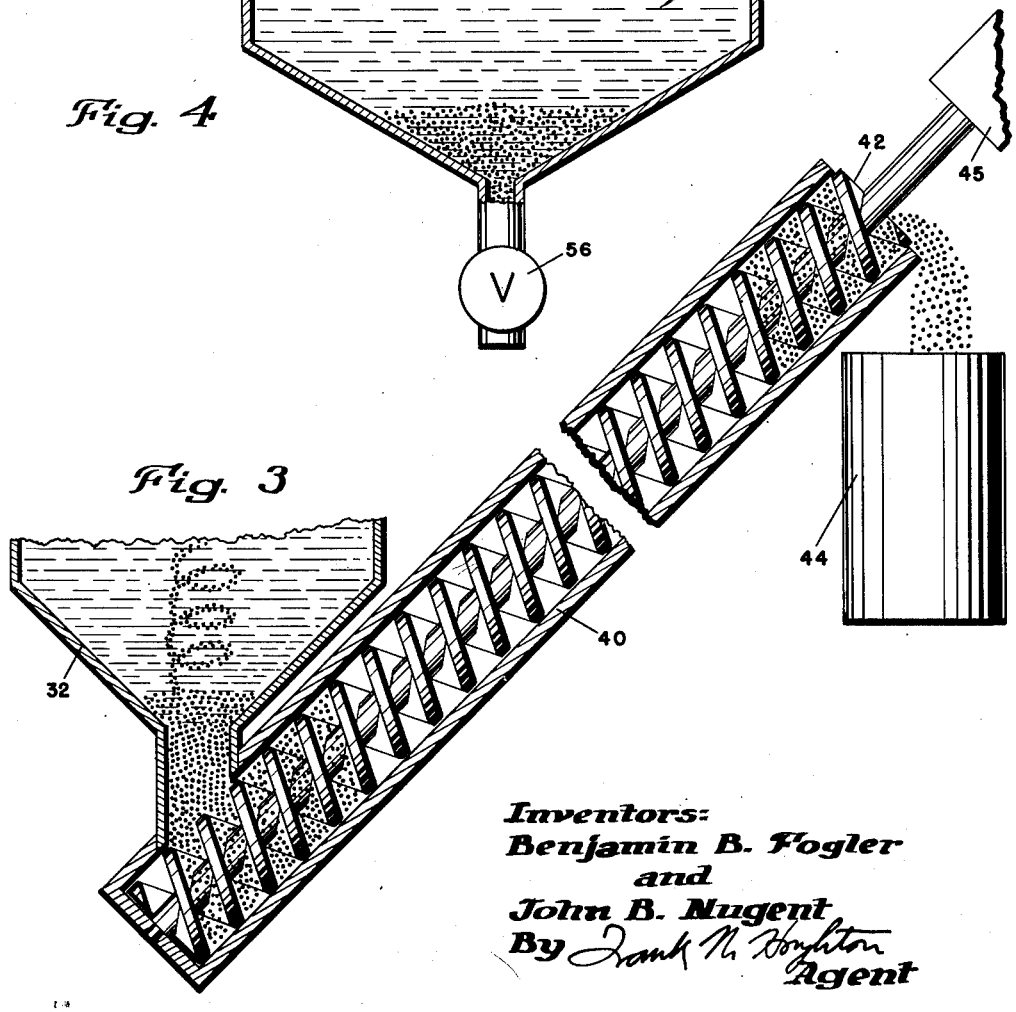

These and other features and advantages of this invention will now be described in greater detail with reference to the accompanying drawings, wherein Fig. 1 shows a preferred embodiment of the present invention, in vertical section, Fig. 2 shows, in vertical section, a modified form of an arrangement for increasing the cross-sectional area of the helical path, Figs. 3 and 4 show, also in vertical section, modified arrangements for removing the extracted coffee grounds from the system, and Fig. 5 shows, also in vertical section, a modified positioning for the casing and the screw and associated parts.

Referring now to Fig. 1, there is provided a vertically disposed casing 10, and therein a helical screw 12 having an axial shaft 14 which extends at its upper end into gear box 16, whereby it is turned by the gears powered by motor 18 or any other suitable source of power. Adjacent the upper end of casing 10 is hopper 20 communicating with casing 10 through duct 22 and opening 24. Somewhat below opening 24 are several slots 26 in casing 10; these are covered with wire mesh or other filtering means 28, so that the extract (i. e. the water and extracted solubles of the coffee) rising through casing 10 will flow through said slots 26 and be filtered to prevent ground coffee from passing through the slots. Below slots 26 is provided a trough 30 into which the filtered extract flows after passing through filter 28; the trough 30 surrounds the casing 10 and is provided with one or more draw-off lines 31 for removing the extract. At its lower end casing 10 enters a chamber 32 into which fresh hot water is introduced through pipe 34 controlled by valve 36. At the bottom of chamber 32 is valve means 38 for removing extracted coffee grounds which descend from the bottom of the casing 10.

The pitch of the turns of helical screw 12 is smaller at the top than throughout the rest of the length of the screw. The change of pitch occurs below opening 24—so that the amount of coffee entering is dependent upon the pitch at that opening, and is consequently metered by the screw—and above the point where the coffee is thoroughly saturated with liquid. Hence the change of pitch should be in the region of the bottom of slots 26, which is approximately at the liquid levels in trough 30 and casing 10.

In operation, the ground coffee is fed into hopper 20, the screw 12 is turned by power from motor 18, and in the proper direction to cause the coffee to move downwardly toward chamber 32, and hot water at preferably about 180° F. to 220° F. is led into chamber 32 through pipe 34 by opening valve 36. Chamber 32 fills with water, as does casing 10 up to slots 26, and the operation proceeds with the coffee and the water moving continuously and countercurrently, and the extract being withdrawn through pipe 31 for whatever further processing or operations may be desired. The initial effluent from pipe 31 may be discarded if desired, as it is not identical with the effluent obtained when equilibrium has been established. However, such equilibrium is established within a matter of a very few minutes after starting (i. e. as soon as the coffee and the water extend throughout the length of the casing). The ground coffee fills the space within casing 10 between the turns of the screw or helicoid 12, in such a way that plugging or jamming is avoided and the water flows between and around the coffee granules. The hot water is introduced through pipe 34 under pressure sufficient to cause it to flow thus, and out through slots 26. Extracted coffee falling from the bottom of the screw 12 and casing 10 passes by gravity to the bottom of chamber 32. Thence it is removed as desired by removal means broadly indicated by the numeral 38, which means should be of such form and arrangement as not to disturb appreciably the liquid in chamber 32 or interfere with the continuous introduction of water from chamber 32 into the casing 10. Such removal may be accomplished by various removal means, of which one is shown in Fig. 3 and another in Fig. 4. In the former, chamber 32 opens into helical screw conveyor means 40, which extends upwardly to a level 42 which is at the same height as the slots 26 (Fig. 1), or in other words is at the normal liquid level in tube 10. Thereby the columns of water in conveyor means 40 and casing 10 balance each other. Extracted coffee grains falling out of chamber 32 are moved upward by conveyor means 40 and fall out of the top thereof, at 42, into container 44 whence they are disposed of. The helical screw is turned by any suitable means as shown diagrammatically at 45.

In Fig. 4, the valve means 38 of chamber 32 opens into a lower chamber 46 which is provided with water inlet pipe 48 controlled by valve 50, and water outlet pipe 52 controlled by valve 54. At the bottom of the lower chamber 46 is a valve means 56. In operation, chamber 46 is filled with water (preferably hot) from pipe 48, and flow of water into and out of the chamber is established by keeping valves 50 and 54 open. Valve means 38 is then opened, and extracted coffee grains accumulated above it fall into lower chamber 46 without disturbing the other conditions in chamber 32. Valve means 38 is then closed. Then the grounds are dumped by opening valve means 56; and it is immaterial to the continuous operation of the extraction process in the apparatus above valve means 38 whether or not all or part of the water in chamber 46 is dumped when valve means 56 is opened, since chamber 46 is refilled with water before valve means 38 is reopened.

In Fig. 2 is shown an alternative arrangement for increasing the cross-sectional area of the helical path traversed by the coffee and the water, wherein instead of the pitch of the turns of helical screw 12 being increased, the diameter of casing 10 is increased. This increase occurs at substantially the same point as the pitch increase, and it may be more or less gradual than the form shown in Fig. 2. Shaft 14, duct 22, opening 24, slots 26, screen 28, trough 30 and pipe 31 are the same as in Fig. 1, or substantially so, and their arrangement and functions are as already described with reference to Fig. 1.

The size or cross-sectional area of the helical path or passageway traversed by the coffee and the water is, as already indicated, determined by the distance between the surfaces of adjacent turns of the screw and the distance between the axis or axle of the screw and the inside walls of the casing. These distances, and hence the cross-sectional area, may be varied in a number of ways, as will be evident to those skilled in this art. Thus, the distance between the surfaces of adjacent turns of the screw may be varied as shown in Fig. 1, or in other ways such as changing the thickness of the threads (turns) with or without changing the pitch. The distance between the axle of the screw and the inside wall of the casing may be varied as shown in Fig. 2 or in other ways such as by changing the diameter of the axle. Combinations of these various ways may also be employed, depending upon convenience of manufacture of the apparatus, and other factors.

The direction of rotation of the helical screws is from left to right in the drawings of Figs. 1, 2 and 4, and from bottom to top in the drawing of Fig. 5. In other words, the screws shown in all of the drawings rotate counterclockwise when viewed from the driven end.

The extracting zone may be arranged other than vertically, e. g. horizontally as shown in Fig. 5. Construction and operation of the apparatus of Fig. 5 will be obvious by reference to Fig. 1, inasmuch as the numerals applied to the parts of Fig. 5 refer to like-numbered parts in Fig. 1 plus 100. Thus, in Fig. 5, ground roasted coffee is fed into hopper 120, the helical screw 112 within horizontal casing 110 is turned by power applied through gear box 116 to screw shaft or axle 114, and the coffee moves downwardly through duct 122 and opening 124 into the extracting zone. Thence it moves toward the right and falls into chamber 132, while the heated water introduced through pipe 134 controlled by valve 136 moves countercurrently with respect to the coffee and passes out through screen 128 and pipe 131 to receiving means (not shown). The increase in pitch of the screw 112 is at a slight distance to the right of opening 124, as indicated in the drawing. Alternatively, an increased diameter of casing may be used of the type shown in Fig. 2.

In order to counteract radiation losses from casing 10, and provide a closer control of the temperature gradient therein from the hotter (bottom) and to the cooler (top) end, the casing may be provided with any suitable jacketing arrangement of which one form is shown in Fig. 1. In that arrangement, a series of jackets 60, 62, and 64 is provided, having inlets 61, 63 and 65 and outlets 61', 63' and 65', respectively, for flow of fluid into and out of the jackets. Hot water or other suitable fluid, at a temperature such as to maintain the contents of casing 10 within the desired temperature ranges at the different levels or zones, is introduced into inlets 61, 63, and 65, circulates through the jackets 60, 62 and 64 respectively, and passes out through outlets 61', 63' and 65' respectively. Such an arrangement of course makes it possible to provide a very small temperature gradient, or, if desired, the water circulating through jackets 60, 62 and 64 may be hot enough so that substantially the same temperature may be maintained throughout the extracting zone.

The use of such a jacketing arrangement is entirely optional, however, and the apparatus may be operated satisfactorily without jacketing, as shown in Figs. 2 and 5. On the other hand, conventional heat lagging or insulation may be used, with or without the aforesaid jacketing, and on such parts of the apparatus as may be deemed advisable.

We claim:

1. Process for the continuous countercurrent extraction of ground roasted coffee which comprises continuously introducing said coffee into one end of an elongated passageway so as to fill said passageway throughout the diameter thereof, moving said coffee continuously away from said end through said passageway toward the other end thereof and into contact with water flowing countercurrently to said coffee thereby causing said coffee to be wetted by said water and to swell, continuing the movement countercurrent to said water, of said swelled wetted coffee, as it swells, into a zone of larger cross-section extending throughout the remainder of said passageway whereby to prevent plugging of the passageway by the swelled coffee, continuously removing said coffee from the end of said passageway after its travel therethrough, continuously introducing fresh hot water free of dissolved coffee solids into said passageway adjacent the point of exit of said coffee therefrom, and continuously removing said water, after its flow through said passageway in countercurrent extractive relationship with said coffee, together with its contained coffee solids, at a point adjacent the point of initial introduction of said coffee.

2. Process according to claim 1, wherein said fresh hot water is introduced at a temperature of approximately 180° F. to 220° F., and said water and its contained coffee solids are removed at a lower temperature of approximately 165° F., and the temperature of said water is controlled along its course through said passageway by the application of auxiliary heat.

BENJAMIN B. FOGLER.
JOHN B. NUGENT.

REFERENCES CITED

The following references are of record in the file of this patent:

UNITED STATES PATENTS

| Number | Name | Date |
|---|---|---|
| 173,078 | Stacy | Feb. 1, 1876 |
| 617,322 | Duke | Jan. 10, 1899 |
| 731,028 | Eschwege | June 16, 1903 |
| 1,081,949 | Dupont | Dec. 23, 1913 |
| 1,494,090 | Wilson | May 13, 1924 |
| 1,534,737 | Reed | Apr. 21, 1925 |
| 1,628,787 | Kennedy | May 17, 1927 |
| 1,793,465 | Coahran | Feb. 24, 1931 |
| 1,866,415 | Lorand | July 5, 1932 |
| 1,972,164 | Pierce | Sept. 4, 1934 |
| 2,015,832 | Ahlquist | Oct. 1, 1935 |
| 2,050,303 | Forshee | Aug. 11, 1936 |
| 2,183,837 | Hamilton et al. | Dec. 19, 1939 |
| 2,191,255 | Bonotto | Feb. 20, 1940 |
| 2,203,666 | Bonotto | June 11, 1940 |
| 2,282,138 | Kellogg | May 5, 1942 |
| 2,381,965 | Berry | Aug. 14, 1945 |
| 2,439,780 | Napier | Apr. 13, 1948 |